Figure 1:
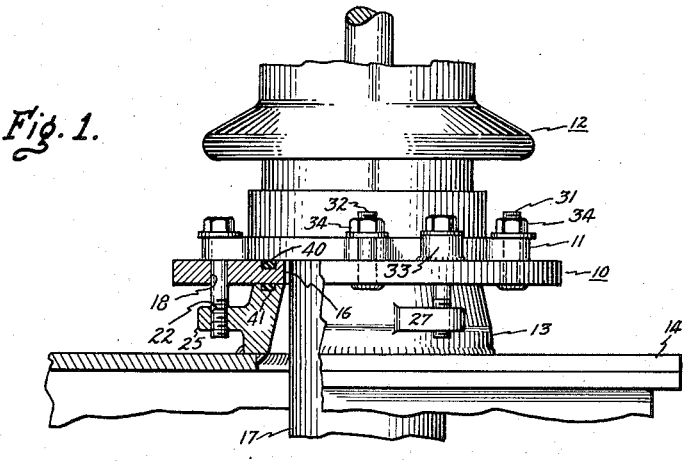

Aug. 26, 1958 — J. C. DUTTON — 2,849,528
HIGH VOLTAGE BUSHING ADAPTER
Filed July 27, 1955

Inventor
John C. Dutton,
by Gilbert P. Tarleton
His Attorney.

United States Patent Office 2,849,528
Patented Aug. 26, 1958

2,849,528

HIGH VOLTAGE BUSHING ADAPTER

John C. Dutton, Rome, Ga., assignor to General Electric Company, a corporation of New York Application July 27, 1955, Serial No. 524,732

3 Claims. (Cl. 174—152)

This invention relates to bushings for high-voltage electrical apparatus, and more in particular to adapter means to enable the use of high-voltage bushings having four mounting apertures on stationary, induction electrical apparatus such as transformers adapted for bushings having only three mounting apertures.

Heretofore it has been standard to employ bushing-mounting flanges having three symmetrically located mounting apertures. Present practice, however, dictates the provision of four symmetrically located mounting apertures, the diameter of the mounting ring being the same as for the mounting ring of the three-aperture bushing. It is frequently desirable to employ a new-type four-aperture bushing to replace a defective three-aperture bushing since the three-aperture bushing may be more costly due to decreased production. The bushings are mounted to a flange welded to the transformer tank, so it is not feasible in the field to remove this flange and to replace it with one having the desired number of holes. Another consideration is the requirement that no significant change in the height of the bushing extending above the apparatus should result from any adapting means employed, since otherwise the bushing would not extend the proper distance into the transformer or other apparatus to obtain the benefit from the bushing ground sleeve, or it may interfere with the overhead equipment.

It is therefore an object of this invention to provide means for mounting a bushing upon high-voltage, stationary, electrical induction apparatus wherein the mounting apertures in the bushing do not coincide with the mounting means on the apparatus.

Another object is to provide means for mounting an electrical bushing having four mounting apertures on high-voltage, stationary, induction electrical apparatus adapted for a bushing having three mounting apertures, the two sets of apertures being respectively symmetrically spaced around circles of the same diameter.

A further object of this invention is to provide an adapter for mounting an electrical bushing having four symmetrical mounting apertures on a high-voltage electrical induction apparatus adapted for a bushing having three symmetrical mounting apertures, the adapter introducing no substantial change in the height of the bushing above the apparatus or distance that the bushing extends into the apparatus.

Briefly stated, in accordance with one aspect of my invention, I provide an adapter comprised of a circular plate and having a central circular aperture, through which the lower portion of the bushing extends. Three symmetrical mounting holes are drilled through the plate, defining a mounting ring coaxial with the plate. Three studs extend from one side of the plate along the mounting ring, and are positioned such that when a bolt is positioned in one of the drilled mounting holes, the three studs and the bolt are symmetrical. Spacing means may be affixed to the plate surrounding at least a portion of the other two drilled mounting holes and on the same side of the plate as the studs, in order to prevent interference between the flange of the bushing and the mounting bolts. The plate may also have coaxial grooves to receive suitable gaskets.

My invention will be better understood from the following disclosure taken in connection with the accompanying drawing, and its scope will be pointed out in the appended claims.

Figure 2:
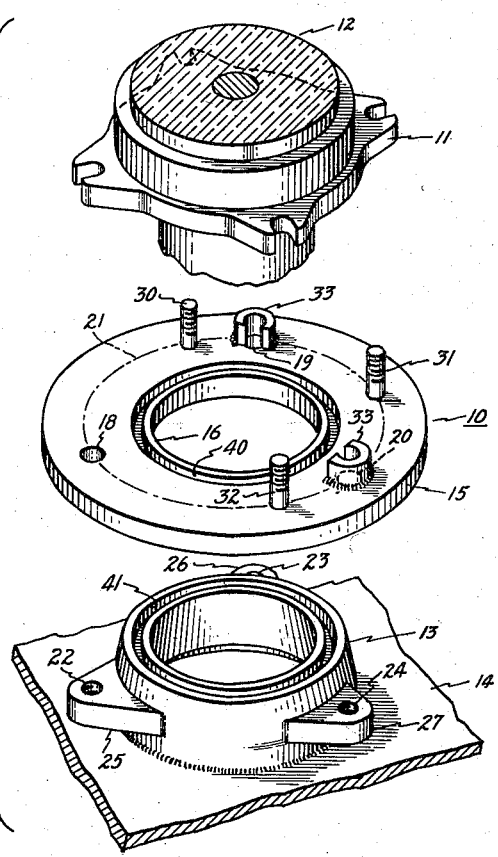

In the drawing:

Fig. 1 is a partially cross-sectional view of the bushing adapter of my invention and illustrating the adapter in mounted position between the flange on an electrical apparatus adapted for bushings having three mounting apertures and a high-voltage bushing having four mounting apertures, and Fig. 2 is an exploded perspective view of the bushing adapter of Fig. 1, the adjacent parts of a bushing having four mounting apertures, and a through aperture flange on the tank of an electrical apparatus.

Referring now to the drawing, therein is illustrated a bushing adapter 10 mounted between a flange 11 of a high-voltage bushing 12 and a flange 13 welded to the tank cover 14 of a high-voltage electrical apparatus. The adapter 10 is comprised of a circular plate 15 having a central aperture 16 through which the lower portion 17 of the high-voltage bushing 12 extends. Three symmetrical holes 18, 19 and 20 are drilled in the plate 10 and define a "mounting ring" 21. These drilled three holes 18, 19 and 20 are in line with holes 22, 23 and 24 respectively which are tapped in projections 25, 26 and 27 respectively welded to the flange 13 or other suitable mounting means. Three threaded studs 30, 31 and 32 are welded to the upper surface of the plate 15, and extend upwardly from the mounting ring 21. These studs are positioned such that in combination with the drilled hole 18 they form four symmetrical mounting means along the mounting ring 21. Spacers 33 are welded to the upper surface of the plate 15 partially surrounding the drilled mounting holes 19 and 20.

When the bushing 12 and adapter 10 are assembled on the tank cover 14, the three studs 30, 31 and 32 project upwardly through three of the mounting apertures (which may be slots or holes) of the mounting flange 11 of the high-voltage bushing 12 and the bushing flange 11 is held firmly against the plate 15 by means of nuts 34 threaded to the studs. The lower surface of the plate 15 is held against the tank-cover flange 13 by means of bolts passing downwardly through the holes 18, 19 and 20 and into the threaded holes 22, 23 and 24 respectively. The bolt passing through the holes 18 and 22 also passes through one aperture on the bushing flange 11, while the other two bolts pass through the spacers 33. The spacers 33 are provided so that the heads of the bolts passing through the holes 19 and 20 do not interfere with the mounting flange 11.

If desired, a groove 40 may be provided in the upper surface of the plate 15 coaxial with the aperture 16 to receive a gasket, in order to prevent dielectric fluid leakage between the flange 11 and the plate 15. A groove 41 may also be provided in the upper surface of the flange 13 to receive a gasket in order that dielectric fluid does not escape between the flange 13 and the plate 15.

It will be understood, of course, that, while the form of the invention herein shown and described constitutes a preferred embodiment of the invention, it is not intended herein to illustrate all of the possible equivalent forms or ramifications of the invention. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. An adapter for mounting a bushing having four symmetrical mounting apertures on a high-voltage electrical apparatus adapted for bushings having three symmetrical mounting apertures spaced on a circle having the same diameter as the circle around which the apertures of the four-aperture bushing are disposed, comprising a metallic plate having a central circular aperture through which the lower end of a bushing extends, said plate having three symmetrical mounting holes defining a mounting ring coaxial with said aperture, three threaded studs extending from one side of said plate along said mounting ring, said studs being positioned with respect to one of said mounting holes so that in combination with said one mounting hole they form four symmetrical mounting means, and spacing means extending from said one side of said plate and at least partially surrounding the other two of said mounting holes.

2. An adapter for mounting a bushing having four symmetrical mounting apertures on a high-voltage electrical apparatus adapted for bushings having three symmetrical mounting apertures spaced on a circle having the same diameter as the circle around which the apertures of the four-aperture bushing are disposed, comprising a circular metallic plate having a central circular aperture through which the lower end of an electrical bushing extends, said plate having three symmetrical mounting holes defining a mounting ring coaxial with said circular aperture, three threaded studs extending from one side of said plate along said mounting ring, two of said studs being mounted on a first diameter of said circular plate on opposite sides of said aperture, the other stud being mounted on another diameter of said plate perpendicular to said first diameter and passing through one of said mounting holes, and spacing means extending from one side of said plate and at least partially surrounding the other two of said mounting holes.

3. Means for mounting a bushing having four symmetrical mounting apertures on a high-voltage electrical apparatus adapted for bushings having three symmetrical mounting apertures spaced on a circle having the same diameter as the circle around which the apertures of the four-aperture bushing are disposed, comprising a bushing having a mounting flange with four symmetrical mounting apertures, a circular metallic plate in face to face relation with the lower side of said mounting flange, said plate having a central circular aperture through which the lower end of said bushing extends, said plate having three symmetrical mounting holes defining a mounting ring coaxial with said central aperture, three studs affixed to said plate and extending upwardly from said mounting ring through three of said mounting apertures in said bushing flange, one of said mounting holes of said plate being adjacent the remaining bushing-flange-mounting aperture, first bolt means passing through said one mounting hole and said remaining mounting aperture spacing means extending upwardly from said plate and at least partially surrounding the other two mounting holes in said plate, and second and third bolt means through said two mounting holes for holding said bushing and adapter on said apparatus, said spacing means preventing interference between said flange and said second and third bolt means.

References Cited in the file of this patent
UNITED STATES PATENTS

| | | |
|---|---|---|
| 1,807,844 | Huffman | June 2, 1931 |
| 1,873,191 | Fabrey | Aug. 23, 1932 |
| 2,363,265 | Schatzman | Nov. 21, 1944 |
| 2,569,275 | Baker | Sept. 25, 1951 |
| 2,711,874 | Nelson | June 28, 1955 |